March 18, 1958  L. R. KOLLER  2,827,593
HIGH PURITY COLOR INFORMATION SCREEN
Filed April 29, 1955
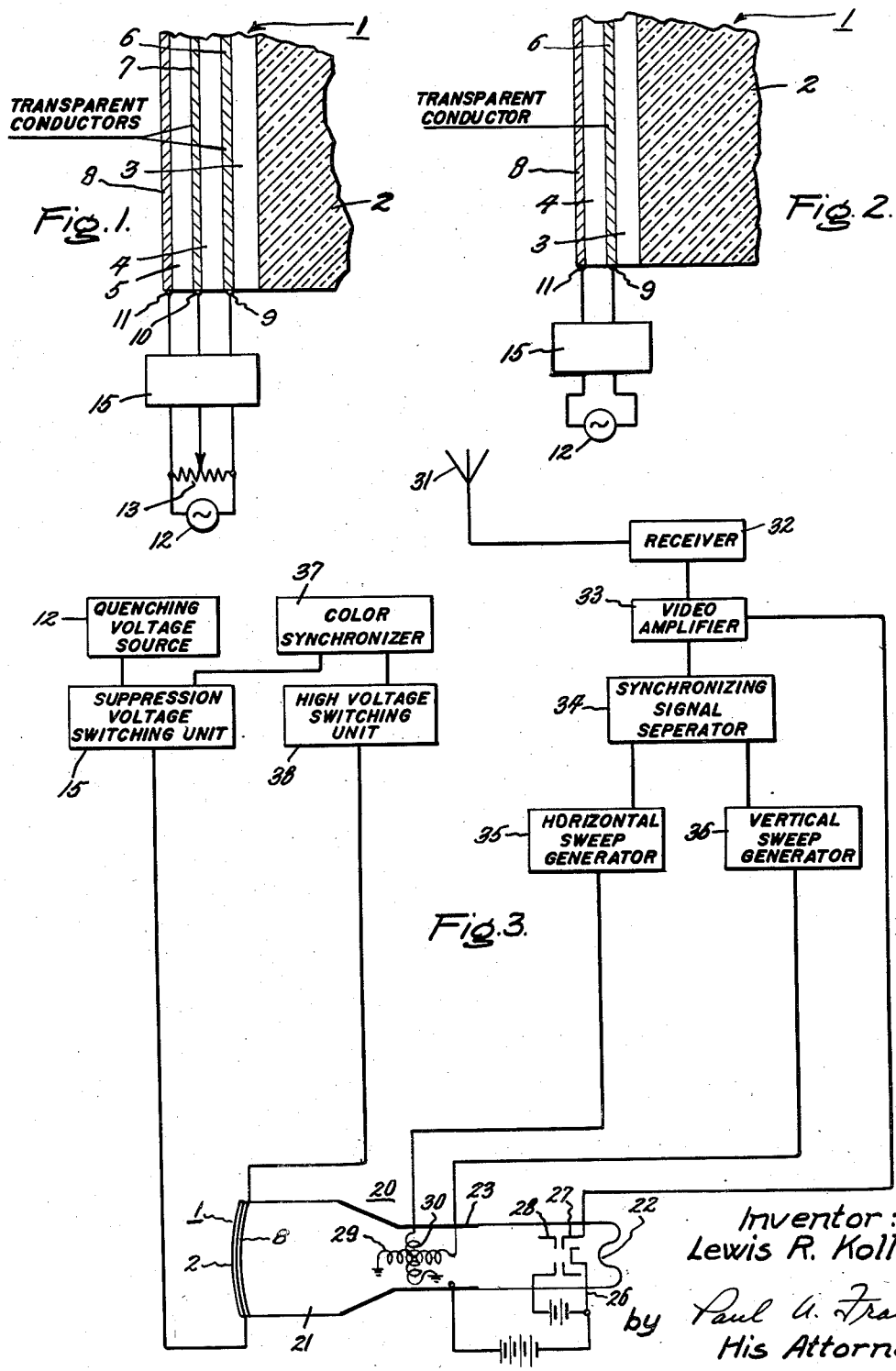
Inventor:
Lewis R. Koller,
by Paul A. Frank
His Attorney.

United States Patent Office 2,827,593
Patented Mar. 18, 1958

2,827,593

HIGH PURITY COLOR INFORMATION SCREEN

Lewis R. Koller, Schenectady, N. Y., assignor to General Electric Company, a corporation of New York Application April 29, 1955, Serial No. 504,773

4 Claims. (Cl. 315—21)

This invention relates to the production of high purity color images as in color television, color radar, and like applications. More particularly, it relates to luminescent screens for producing color effects and to screens which are adapted to suppress spurious luminescence which detracts from the purity of the color information portrayed.

The color luminescent screens to which the present invention is directed are generally referred to as "penetron" type screens. A "penetron" type color luminescent screen is one in which color switching is accomplished by varying the energy of the exciting cathode ray beam. The screens comprise a plurality of superposed, luminescent phosphor films, each of which emits light of a different characteristic color when excited by impinging cathode rays. The energy of the exciting cathode rays may be varied to vary the depth of penetration of the beam and thereby control the color emitted by the screen.

While the "penetron" type screens of the prior art are generally satisfactory, the purity of emitted light is somewhat diminished by spurious emission, caused by electrons traversing near phosphor layers to excite the more remote layers.

It is therefore an object of the present invention to improve the purity of light emission from "penetron" type color luminescent screens.

Another object of the invention is to produce a high purity color luminescent screen which eliminates spurious emission due to penetration of electrons through at least one color luminescent film.

A further object of the invention is to produce color luminescent screens capable of producing higher purity color images than known color screens of the prior art.

Further objects and advantages of the invention will become apparent and the invention may be better understood from a consideration of the following description taken in conjunction with the drawing, in which:

Fig. 1 shows a penetron type color information portraying screen, constructed in accordance with the invention, in which the screen comprises three different color light emitting phosphor films;

Fig. 2 shows a screen similar to that of Fig. 1 adapted for a two-color television system; and Fig. 3 shows a typical circuit in connection with which the present invention may be utilized.

Briefly stated, in accordance with one of its broad aspects, the invention provides a high purity color information producing screen including a plurality of phosphor films each capable of producing a different color emission when excited by cathode rays and means for applying a quenching field across at least one of these films. Thus, in a penetron type system, the spurious emission which would ordinarily be caused in one or more near phosphor films by the penetration of a high energy electron into a remote phosphor film is quenched by the application of an electric field to the film or films in which spurious emission occurs. The resultant emission from the screen of the invention is thus of high purity and characteristic only of the phosphor film in which the high energy electron gives up the majority of its energy causing the emission of visible light.

In Fig. 1 of the drawing there is shown a high purity color luminescent screen constructed in accord with the invention. The screen of Fig. 1 comprises a composite luminescent film 1 supported upon a transparent base plate 2. Transparent base plate 2 may comprise any transparent material such as quartz or glass which may be heated to temperatures above the order of 600° C. which occur in the production of the transparent phosphor films comprising luminescent film 1. Composite luminescent film 1 is composed of a plurality of transparent continuous phosphor films 3, 4 and 5 separated from one another by a plurality of transparent conducting layers 6 and 7.

Conducting layer 8, which need not be light transparent, is deposited over phosphor film 5 to form a backing for composite luminescent film 1. A spurious emission suppressing voltage is applied through terminals 9—10 and 11 to conducting layers 6, 7 and 8 respectively which serve as electrodes to impress spurious emission quenching fields across phosphor films 3 and 4 respectively. The voltage source for creation of these fields is represented schematically as alternating current source 12 and potentiometer 13. The aplication of the quenching potentials at the proper times is controlled by quenching voltage switching unit 15 which is controlled by the receiving system in which the invention is utilized, as in hereinafter described. Voltage switching unit 15 is conventional and may be any mechanical or electronic commutating means for switching the applied quenching potentials in synchronism with the switching of color signals applied to the control electrode of the cathode ray tube. For example switching unit 15 may comprise a commutating arrangement such as that illustrated in Figure 3 of U. S. Patent No. 2,461,515 to A. B. Bronwell.

Transparent luminescent phopshor film 3 may be deposited upon base plate 2 by the method described in U. S. Patent No. 2,685,530 to D. A. Cusano and F. J. Studer. According to this method, a transparent base plate 2 is suspended within an evacuable reaction chamber and raised to a temperature from approximately 400° C. to 600° C. A charge including a first component of the phosphor film to be formed as, for instance, zinc together with minor portions of activator including materials as, for example, zinc chloride and the chlorides of silver, manganese, or copper, is continually metered into a refractory crucible which is heated to a temperature above the vaporization temperature of the constituents of the charge so that a vapor of the materials constituting the charge continually fills the volume of the vessel. At the same time, a stream of a gas containing a second component of the phosphor film to be formed, for example, hydrogen sulfide, is introduced at low pressure into the reaction chamber. The hydrogen sulfide gas reacts with the constituents of the charge forming a transparent continuous non-granular layer of activated phosphor, for example, zinc sulfide activated with silver, upon base plate 2. This method may be used to produce, for example, silver activated films of zinc sulfide, silver activated films of zinc cadmium sulfide, or silver activated films of mixed sulfides of zinc and cadmium. Additionally, the selenides of zinc or cadmium or mixtures thereof may also be formed by this method by substituting hydrogen selenide for hydrogen sulfide gas within the vessel. The thickness of the vapor deposited layer of phosphor 3 may be regulated merely by lengthening or reducing the time that the reaction is carried out. The formation of a "penetron" type color presentation screen comprising uniform, transparent, vapor-deposited phosphor films is not my invention but is disclosed and claimed in the copending application of D. A. Cusano and F. J. Studer, Serial No. 465,532, filed October 29, 1954, and assigned to the same assignee as the present invention. While screens 3, 4 and 5 of screen 1 are preferably formed by the above described vapor deposition techniques, it will be appreciated that continuous uniform luminescent films formed by any of the known methods of the prior art, for instance vacuum evaporation, may be used in the color screens of the invention.

Referring again to Fig. 1 of the drawing, transparent phosphor film 3 is overlaid with a thin transparent conducting film 6. Film 6 may conveniently be tin oxide or titanium dioxide. A conducting film of titanium dioxide may be produced by passing titanium tetrachloride vapors over the vapor deposited film of luminescent phosphor 3 in a moist atmosphere noting the thickness of the resulting film by the formation of orders of interference colors. The method of controlling the thickness of a transparent film by the formation of orders of interference colors is well known to the art and will not be described herein. Conveniently, the thickness of transparent conducting film 6 may be approximately ¼ to ¾ micron. As deposited, the film has a high resistivity but the subsequent vapor deposition, at high temperatures, of additional layers of transparent luminescent films renders the film conducting to the extent that it may be used as an electrode as is hereinafter described with particularity. After the deposition of conducting transparent film 6 the process described with respect to transparent luminescent film 3 is repeated with different constituents to form a second transparent vapor-deposited luminescent film 4 overlying transparent conducting film 6. Titanium tetrachloride vapor is once again passed over film 4 and interference color formation is noted to regulate the thickness of second transparent conducting film 7 formed thereby. As with transparent conducting film 6, conducting film 7 may conveniently be from ¼ to ¾ micron thick. After transparent conducting film 7 has been formed upon transparent luminescent film 4, a third transparent luminescent film 5 is formed upon transparent conducting film 7 by the means described hereinbefore with respect to the formation of transparent luminescent film 3.

After the formation of luminescent film 5 has been completed, this film may be covered with a conducting layer which may conveniently be a thin metallic layer of aluminum formed by evaporation or sputtering by techniques well known to the art. While conducting films 6 and 7 must be transparent for the operation of the penetron type color screen it is not necessary that conducting film 8 be transparent; in fact, film 8 is preferably a reflecting film to direct all the light energy generated within luminescent screen 1 out through transparent base plate 2 for visual observation.

The embodiment of the invention illustrated in Fig. 1 and described hereinbefore is designed to be used in a three component color information portraying system. In such a system, although the position of the individual components may be varied, film 3 may conveniently be a green emitting phosphor, film 4 may conveniently be a blue emitting phosphor and film 5 may conveniently be a red emitting phosphor. Since the penetration of electrons into the composite luminescent screen 1 determines the color of the emitted light caused thereby, and since the penetration of individual electrons depends upon their energy, the highest energy electrons will penetrate into film 3, electrons having less energy will penetrate only into film 4 and electrons having the least energy will penetrate only into film 5. It is desirable that the thickness of the individual films 3, 4 and 5 increase as the position toward transparent base plate 2 decreases. Thus, film 5 is ordinarily the thinnest, and may conveniently be 1 micron thick. Film 4 is thicker and may conveniently be approximately 10 microns thick, while film 3 is the thickest and may conveniently be approximately 20 microns thick, although there is no practical limitation to the thickness of this film so long as it is transparent. With such thicknesses, electrons having from 5 to 10 kilovolts energy will ordinarily come to rest within film 5 and cause the emission of red light while films having from 10 to 20 kilovolts energy will ordinarily come to rest within film 4 causing the emission of blue light and electrons having from 20 to 30 kilovolts energy will come to rest within film 3 causing the emission of green light. While particular film thicknesses have been given together with corresponding electron energies, it will be appreciated that these values are given by way of example only, and that in the practice of my invention the film thicknesses and beam energies may be varied over a wide range.

While the constituents comprising phosphor films 3, 4 and 5 may be varied to include a number of luminescent phosphors well known to the art, films 3, 4, and 5 may conveniently all be chosen from a system of zinc-cadmium sulfides activated with silver. Thus, for example, red emitting phosphor film 5 may be composed of a zinc-cadmium sulfide activated with approximately 0.005% by weight of silver, in which the cadmium comprises approximately 90% and the zinc approximately 10% of the sulfide. Likewise, blue emitting phosphor film 4 may comprise a zinc sulfide phosphor activated with approximately 0.005% by weight of silver. Green emitting phosphor film 3 may conveniently comprise a zinc-cadmium sulfide in which the zinc comprises 60% by weight and the cadmium comprises 40% by weight of the sulfide present, activated with 0.005% by weight of silver. As mentioned hereinbefore, the composition of phosphor layers 3, 4 and 5 may be conveniently controlled by varying the constituents supplied to the reaction chamber in which the films are formed, while the thickness thereof may be easily controlled by the length of time the reaction is carried on. While specific examples of red, green and blue emitting phosphors have been given, it will be appreciated that any cathodo-luminescent phosphors which emit these colors and which may be deposited in thin continuous films may also be used.

In the operation of the device shown in Fig. 1, assume a high energy electron having approximately 25 kilovolts energy impinges upon the composite luminescent screen 1. This electron will penetrate through films 5 and 4, and come to rest within luminescent film 3 giving rise to the emission of green light. Although the vast majority of the energy of such an electron will be transmitted to phosphor film 3 causing the emission of green light, without the quenching fields of the invention a portion of the energy of the electron would be dissipated within film 5 while the electron is in transit therethrough, causing the emission of small amounts of red light. Likewise, while the electron is passing through film 4, a small amount of energy would be transmitted thereto causing the emission of a slight amount of blue light. The total sum of all the emissions is predominantly green but the purity of the green is diminished by the spurious emission within films 4 and 5. According to my invention, I apply an alternating or pulsed voltage across films 4 and 5 when high energy electrons are directed to film 3 to cause the emission of green light. It has been found that alternating or pulsed voltages applied across continuous, non-granular cathodoluminescent screens have a quenching effect upon luminescence therein. Thus, by applying an alternating or pulsed voltage between film electrodes 6 and 7 the luminescence which would otherwise be caused within film 4 due to the passage of a high energy electron thereto is quenched. Likewise, by applying an alternating or pulsed voltage between film electrodes 7 and 8 while a high energy electron is passing through film 5, there is caused the quenching of the emission which would ordinarily be caused within film 5 by the passage of such an electron.

Since, in the operation of a color cathode ray tube, the cathode to screen potential is switched at a high rate, the frequency of the spurious emission quenching voltage must be of a higher frequency than the frequency of switching. If this condition does not prevail the quenching voltage may be almost a steady state voltage with respect to the switching period of the tube. Thus, in a frame sequential color presentation system where the period of switching is approximately 1/60 second, the quenching voltage frequency must be 90 cycles per second or greater. In a line sequential color presentation system in which the period of switching is approximately $2 \times 10^{-5}$ seconds, the quenching voltage frequency must be greater than approximately 50 kilocycles per second. It is not necessary, however, that the quenching voltage be a sinusoidal voltage, nor that it be a true alternating voltage. A pulsed unidirectional voltage of the proper frequency is equally as good. In order to cause such quenching, it has been found that field strengths of the order of approximately $10^4$ volts per centimeter are ideally suited. Since the thicknesses of films 4 and 5 are very small, film 5 being, for example, 1 micron thick and film 4 being, for example, 10 microns thick, the voltage necessary to cause such spurious emission quenching is not very great. Thus, for example, a potential of 1 volt applied across film 5 having a thickness of approximately 1 micron will result in a field of approximately $10^{-4}$ volts per centimeter being impressed across film 5. Likewise, if a voltage of 10 volts is applied across film 4 having a thickness of approximately 10 microns a field of approximately $10^4$ volts per centimeter is impressed across film 4. Conveniently, an 11 volt alternating or pulsed voltage source 12 may thus be connected through a suitable voltage dividing potentiometer 13 to electrodes 9, 10 and 11 to apply the requisite potentials to film electrodes 6, 7 and 8 to cause quenching within films 4 and 5, while high energy electrons are causing the emission of green light from film 3. It follows, of course, that when the electron beam is carrying information to present a blue image by the excitation of phosphor film 4 voltage switching unit 15 is synchronized to apply a quenching field to film 5 only.

In Fig. 2 of the drawing there is illustrated a high purity color luminescent screen constructed in accordance with the invention and adapted to be used with a two component color portraying system. In Fig. 2 like numbers have been used to identify parts analogous to similar parts in Fig. 1 of the drawing. Thus, transparent base plate 2 has supported thereon two color emitting transparent luminescent phosphor films 3 and 4 separated by a transparent conducting film 6. Transparent luminescent film 4 is overlaid with a conducting film 8 preferably a vaporized metallic film such as aluminum applied by conventional means well known to the art. In a two-color system film 3 may conveniently be a zinc-cadmium sulfide emitting a blue green luminescence. Such a phosphor may be composed of approximately 30% zinc and 70% cadmium of the sulfide present and may be activated with approximately 0.005% by weight of silver. Film 4 may comprise the same constituency as film 5 in Fig. 1, namely, 90 parts cadmium to 10 parts zinc in a zinc-cadmium sulfide mixture activated with 0.005% by weight of silver. Such a phosphor emits red light when activated by cathode rays. Since there are only two transparent luminescent films present in the embodiment of Fig. 2, it is necessary to connect a quenching voltage across only the luminescent film furthermost from transparent base plate 2, as is indicated in Fig. 2. This quenching voltage is applied to film 4 when high voltage electrons pass therethrough to excite film 3 to luminescence.

In order that the means of applying the teaching of the present invention may be more readily understood, reference is made to Fig. 3 which shows schematically a color television receiving unit. It will be understood, of course, that this particular arrangement is shown not in a limiting sense but merely for purposes of illustration. It will also be understood that the present screen may be used wherever it is desirable to convert electrical pulses into color, typical examples being radar and television.

In Fig. 3 a cathode ray tube 20 has an evacuated envelope 21 containing an electron gun 22, a deflecting system 23, a luminescent screen 1 and a face plate 2. Electrons emitted by cathode 26 are controlled and focussed by control grid 27 attracted by first anode 28 and further accelerated towards screen 1 by an accelerating potential applied to conducting film 8 which overlies luminescent film 1. The electron beam is aimed at the desired point of screen 1 by means of the deflecting system which comprises horizontal deflecting coil 29 and vertical deflecting coils 30.

Considering the operation of the illustrative system as a whole, the incoming signal is intercepted by an antenna 31 and is converted to an intermediate frequency by means of a high frequency oscillator in a receiver 32. The signal is usually further amplified by an intermediate frequency amplifier, not shown, to a level suitable for detection. After detection, the signal is amplified in the video amplifier 33 to a proper level and applied to the control grid 27 of cathode ray tube 20. This video signal is also applied to the synchronizing signal separator 34 where timing pulses are derived to synchronize the horizontal and vertical sweep generators 35 and 36. These generators supply sawtooth waves of current to the deflecting coils 29 and 30. The video signal is also applied to a color synchronizer 37 which supplies timing pulses to a high voltage switching unit 38, which in turn furnishes color signals to a post deflection electrode 8 at screen 1 to produce the proper sequence of colors. Color synchronizer 37 also supplies timing pulses to suppression voltage switching unit 15 which supplies spurious emission quenching potentials to the appropriate phosphor layers in accordance with the hereinbefore described operation of the invention so that quenching fields are applied to the proper luminous films to quench spurious emission therein, to provide high purity colors.

The use of a post deflection acceleration cathode ray tube, as in the present example, is preferred because the focus and deflection of the electron beam need not be changed to correspond to each value of the high voltage applied to the screen. Of course, with the addition of proper equipment, the present system may be applied to any type of cathode ray tube, as is well known to those skilled in the art.

While the present invention has been described with particular reference to a color television system, it will be appreciated that it may be applied to any equipment in which it is desired to give a precise and varied color indication in a cathode ray tube. Color radar is an example of another application of the invention.

While the present invention has been described with reference to particular embodiments thereof, it will be understood that numerous modifications may be made by those skilled in the art without actually departing from the invention. Therefore, in the appended claims, I aim to cover all such equivalent variations as come within the true spirit and scope of the foregoing disclosure.

What I claim as new and desire to secure by Letters Patent of the United States is:

1. In a penetron type cathode ray tube wherein the cathode to screen potential is switched at a first predetermined rate to vary the energy of an electron beam impinging upon a luminescent screen, an improved screen for producing high purity colored images comprising a plurality of uniform transparent continuous phosphor films each capable of producing a different color emission when excited by cathode rays, and means for applying a spurious emission quenching field having a magnitude the order of $10^4$ volts per centimeter and a frequency greater than said first predetermined rate across at least one of said films.

2. In a penetron type cathode ray tube wherein the cathode to screen potential is switched at a first predetermined rate to vary the energy of an electron beam impinging upon a luminescent screen, an improved screen for producing high purity colored images comprising a transparent base plate, a plurality of uniform transparent, continuous phosphor films each capable of producing a different color light emission when excited by cathode rays successively deposited upon said base plate, a transparent conducting layer interposed between each pair of adjacent phosphor films and means for applying an electrical potential sufficient to impress a field having a magnitude the order of $10^4$ volts per centimeter and a frequency greater than said first predetermined rate across said phosphor films between a pair of said conducting films to suppress spurious emission within at least one of said phosphor films.

3. In a penetron type cathode ray tube wherein the cathode to screen potential is switched at a first predetermined rate to vary the energy of an electron beam impinging upon a luminescent screen, an improved screen for producing high purity colored images comprising a transparent base plate, a first transparent, continuous phosphor film capable of producing a first color light emission when excited by cathode rays deposited upon said base plate, a transparent conducting film deposited upon said first phosphor film, at least one additional phosphor film capable of producing a different color light emission when excited by cathode rays successively deposited upon said screen, each of said phosphor films being separated from the previously deposited phosphor film by a thin transparent conducting film, a thin conducting film deposited upon the last deposited of said different color light emitting phosphor films, and means for applying a spurious emission quenching field having a magnitude the order of $10^4$ volts per centimeter and a frequency greater than said first predetermined rate across said additional phosphor film.

4. In a penetron type cathode ray tube wherein the cathode to screen potential is switched at a first predetermined rate to vary the energy of an electron beam impinging upon a luminescent screen, an improved screen for producing high purity colored images comprising a transparent base plate, a first transparent continuous phosphor film capable of producing a first color light emission when excited by cathode rays, a first transparent conducting film overlying said first phosphor film, a second continuous phosphor film capable of producing a first color light emission when excited by cathode rays, a second conducting layer overlying said second phosphor film, and means for applying a voltage potential to said first and second conducting layers to impress a spurious image quenching field having a magnitude the order of $10^4$ volts per centimeter and a frequency greater than said first predetermined rate across said second phosphor film.

References Cited in the file of this patent

UNITED STATES PATENTS

| | | |
|---|---|---|
| 2,461,515 | Bronwell | Feb. 15, 1949 |
| 2,543,477 | Sziklai et al. | Feb. 27, 1951 |
| 2,566,713 | Zworykin | Sept. 4, 1951 |
| 2,580,073 | Burton | Dec. 25, 1951 |
| 2,590,018 | Koller et al. | Mar. 18, 1952 |
| 2,590,764 | Forgue | Mar. 25, 1952 |